(12) United States Patent
Moser et al.

(10) Patent No.: US 8,020,324 B2
(45) Date of Patent: Sep. 20, 2011

(54) SPACING ASSEMBLY FOR PIN GRABBER IMPLEMENTS

(75) Inventors: Mark K. Moser, Manhattan, KS (US);
Timothy A. Gardner, Holton, KS (US);
Collin Spellmeier, Wamego, KS (US)

(73) Assignee: Caterpillar Inc., Peoria, IL (US)

( * ) Notice: Subject to any disclaimer, the term of this patent is extended or adjusted under 35 U.S.C. 154(b) by 83 days.

(21) Appl. No.: 11/583,436

(22) Filed: Oct. 19, 2006

(65) Prior Publication Data

US 2008/0092414 A1    Apr. 24, 2008

(51) Int. Cl.
*E02F 3/96* (2006.01)

(52) U.S. Cl. .......... 37/468; 403/317; 403/319; 172/272; 414/723

(58) Field of Classification Search ................. 411/517, 411/518, 519, 353; 403/316, 317, 319, 329, 403/367, 369, DIG. 7, 365, 372, 373; 37/468, 37/903; 172/272; 414/705, 723
See application file for complete search history.

(56) References Cited

U.S. PATENT DOCUMENTS

| | | | | |
|---|---|---|---|---|
| 1,203,071 A | * | 10/1916 | Straub | 403/365 |
| 1,758,515 A | * | 5/1930 | Heiermann | 411/517 |
| 2,131,948 A | | 10/1938 | Graham | |
| 2,416,852 A | | 3/1947 | Schaaff et al. | |
| 2,491,310 A | | 12/1949 | Heimann | |
| 2,886,382 A | * | 5/1959 | Aublys | 384/537 |
| 2,919,940 A | * | 1/1960 | Anderson | 403/365 |
| 2,950,132 A | * | 8/1960 | Kocsuta | 411/518 |
| 2,982,165 A | | 5/1961 | Wurzel | |
| 3,483,789 A | * | 12/1969 | Wurzel | 411/517 |
| 3,807,885 A | | 4/1974 | Coski | |
| 3,987,697 A | | 10/1976 | Wurzel | |
| 4,006,659 A | | 2/1977 | Wurzel et al. | |
| 4,099,444 A | | 7/1978 | Millheiser et al. | |
| 4,133,121 A | * | 1/1979 | Hemphill | 414/723 |
| 4,183,280 A | | 1/1980 | Hashimoto | |

(Continued)

FOREIGN PATENT DOCUMENTS

JP    63-070725    *    3/1988

OTHER PUBLICATIONS

Caterpillar; Pin Grabber Plus Hydraulic Quick Coupler for Caterpillar 322C-385B Hydraulic Excavators; Product Bulletin; Dec. 2005; p. 1.

*Primary Examiner* — Michael P Ferguson
(74) *Attorney, Agent, or Firm* — Liell & McNeil

(57) ABSTRACT

A spacing assembly kit, for use with an implement assembly of a machine, includes a spacing element having a bore and a recess coaxial with the bore, the spacing element being positionable on an implement coupling pin to reduce an implement coupling width, and a spring clamp positionable within the recess and configured to inhibit movement of the spacing element along an implement coupling pin. An implement assembly includes an implement having a body and spaced apart pin supports, with a pin positionable within the pin supports and having an implement coupling width defined by an exposed portion of the pin. Spacing elements are positionable on the pin between the pin supports and configured to reduce the coupling width, spring clamps further being provided which are configured to inhibit movement of the spacing elements when the clamps are engaged about the pin.

20 Claims, 6 Drawing Sheets

U.S. PATENT DOCUMENTS

| | | | |
|---|---|---|---|
| 4,256,010 A * | 3/1981 | Petrie | 411/518 |
| 4,277,199 A * | 7/1981 | Livesay | 403/317 |
| 4,594,040 A * | 6/1986 | Molina | 411/353 |
| 4,734,001 A | 3/1988 | Bennett | |
| 4,813,163 A * | 3/1989 | Livingston et al. | 403/316 |
| 4,836,741 A * | 6/1989 | St. Louis et al. | 414/723 |
| 5,681,060 A | 10/1997 | Berg et al. | |
| 5,720,530 A * | 2/1998 | Holsnijders et al. | 301/105.1 |
| 5,927,665 A * | 7/1999 | Grabnic | 414/723 |
| 6,280,335 B1 | 8/2001 | Wehner et al. | |
| D487,390 S | 3/2004 | Tanaka et al. | |
| 6,857,842 B2 * | 2/2005 | Heiple | 414/723 |
| 6,877,259 B2 * | 4/2005 | Nishimura et al. | 37/468 |
| 7,014,385 B2 * | 3/2006 | Lim et al. | 37/468 |
| 2003/0020324 A1 | 1/2003 | Radke et al. | |

* cited by examiner

SPACING ASSEMBLY FOR PIN GRABBER IMPLEMENTS

TECHNICAL FIELD

The present disclosure relates generally to hardware used in coupling implements with a linkage of a machine, and relates more particularly to a spacing assembly kit for reducing the coupling width of an implement coupling pin having a spacing element and a spring clamp positionable within the spacing element to inhibit movement of the same.

BACKGROUND

A wide variety of work implements are used to perform various tasks, and it is often desirable to facilitate the use of different implements with different machines. Despite the desire for flexibility, manufacturers often produce implements such as buckets, blades, scoops, forks, etc. with coupling hardware that is specific to one machine. In other words, a machine such as an excavating machine may be designed to work with a relatively small number, or certain class of implements, and may have limited ability to pick up and utilize a different class or type of implement without substantial modification to either the machine or the implements and/or coupling hardware itself. Implement-linkage compatibility issues arise frequently where an operator or owner having one machine wishes to use the machine with implements not specifically designed for that machine. Such issues also may arise where a manufacturer offers a new line of machines, a new line of coupling assemblies, or even a new line of implements, and owners or operators wish to continue to use the old machines, implements, etc. with the new line of products.

In one specific example, certain buckets for excavating machines and loaders may have a coupling width compatible with one machine, but incompatible with machines having a different coupling width on the corresponding parts of the linkage or coupling assembly. It is common in certain construction machines to utilize an apparatus called a pin grabber which is configured to couple a hook mounted on a linkage with a pin that is mounted on a bucket. In an attempt to adapt a wider width pin for coupling with a relatively lesser width hook, engineers have utilized free-floating spacers or shims positioned on the pin. The environment within which coupling between a machine and a bucket takes place can subject the coupling hardware to relatively high forces and wear, tending to damage certain of the components over multiple coupling/decoupling cycles. In particular, as an operator moves a linkage to a position at which the associated pin grabber can engage with a pin, he or she may inadvertently strike certain areas of the coupling hardware with the hook, as the hook settles to a desired position about the pin.

The relatively severe stresses involved in such procedures have rendered earlier attempts to use loose spacers or shims to adapt the pin coupling width relatively ineffective. Not only do free floating spacers often require an operator to dismount from the machine and position the spacers at appropriate locations, the engagement of the hook about the pin can break or otherwise damage the spacers. It is thus desirable to provide for an improved means of adapting a coupling width of pins on certain implements for easy attachment with a machine having a different coupling width, without subjecting the coupling hardware to undue stress, strain and premature failure.

As alluded to above, free-floating spacers and shims have clear drawbacks. A need for securing machine parts against axial displacement along a shaft has been recognized for decades. In many traditional designs, parts can be prevented from movement along a shaft via articles known as retaining rings, split-rings and the like. One example of such a retaining ring is known from U.S. Pat. No. 2,491,310 to Heimann. Heimann proposes a retaining ring which is open-ended and adapted to be positioned in a groove provided in a shaft or the like. The purpose of Heimanns' retaining ring is stated to be providing an artificial shaft or pin shoulder to prevent the movement of machine parts in an undesired manner. Heimanns' retaining ring appears capable of exerting pressure against the bottom of its seating groove in the axial shaft or pin, to achieve its stated purposes. This represents one strategy applicable in certain machine environments. Its intended use with a groove on the shaft is undesirable, however, in that the shaft must be modified to form the groove, potentially reducing the integrity of the shaft, and also requiring machining steps to adapt a particular shaft for use with Heimanns' retaining ring, drawbacks which are unacceptable in many machine applications.

SUMMARY OF THE DISCLOSURE

In one aspect, the present disclosure provides a spacing assembly kit that includes a spacing element having a first end and a second end and including a thickness between the first end and the second end. The spacing element further includes a bore extending between the first end and the second end and a recess coaxial with the bore and disposed at the first end. The spacing element is positionable on an implement coupling pin to reduce an implement coupling width thereof. The spacing assembly kit further includes a spring clamp positionable at least partially within the recess of the spacing element and configured to inhibit movement of the spacing element along an implement coupling pin. The clamp has a thickness less than the thickness of the spacing element and includes an outer diameter and an inner diameter configured to engage about a pin.

In another aspect, the present disclosure provides an implement assembly that includes an implement having a body and spaced apart pin supports coupled to the body. The implement assembly further includes a coupling assembly configured to couple the implement with a linkage, the coupling assembly comprising a pin positionable within the pin supports and having an implement coupling width defined by an exposed portion of the pin. The coupling assembly further includes spacing elements positionable on the pin between the pin supports and configured to reduce the coupling width, and spring clamps configured to inhibit movement of the spacing elements when the clamps are engaged about the pin.

In still another aspect, the present disclosure provides a method of setting a coupling width for an implement assembly. The method includes positioning a pin in spaced apart pin supports on one of an implement and a linkage coupler, and positioning spacing elements on the pin at first and second locations between the pin supports, defining a coupling width of the pin. The method further includes moving spring clamps along the pin, including relieving a spring force of the clamps on the pin, and inhibiting movement of the spacing elements from their first and second locations via the clamps, including reestablishing a spring force of the clamps on the pins.

DETAILED DESCRIPTION

Figure 1:
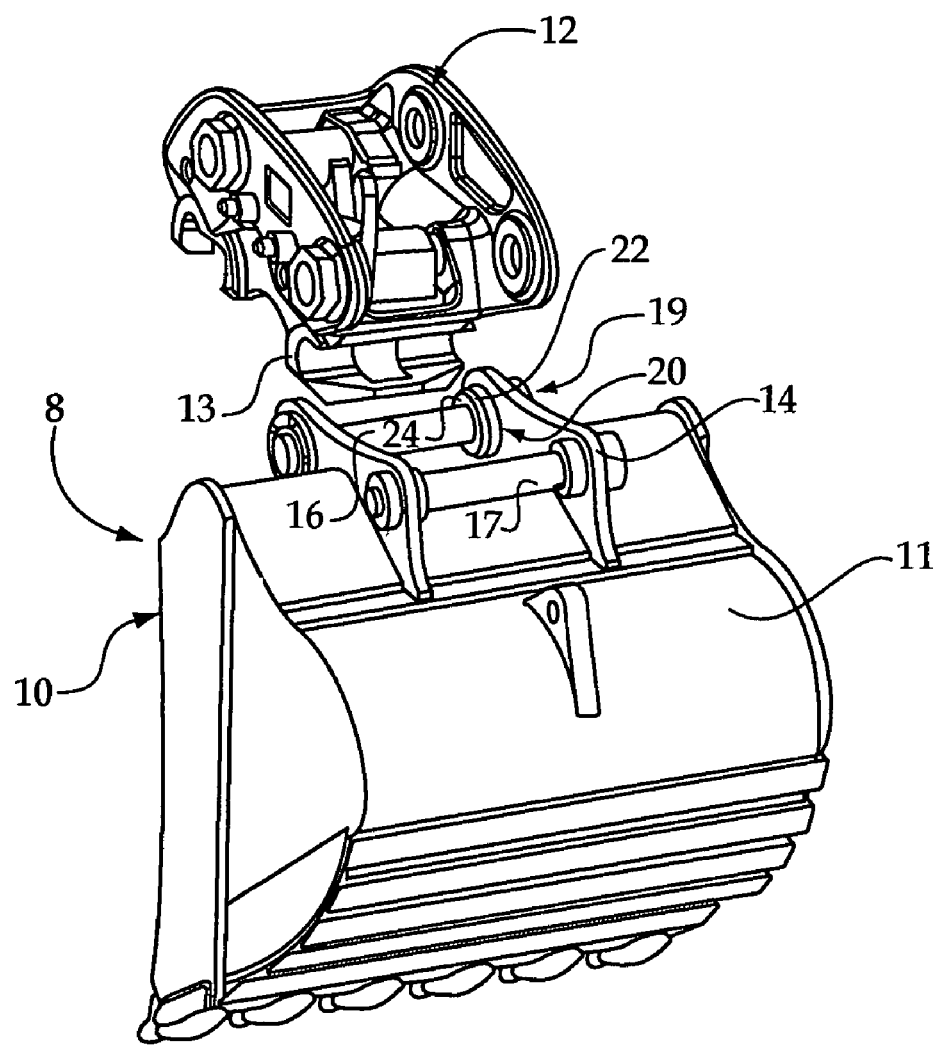
FIG. 1 is a pictorial view of an implement assembly and coupler according to one embodiment.

Referring to FIG. 1, there is shown an implement assembly 8 and a coupler 12. Implement assembly 8 includes an implement 10, for example, a bucket having a bucket body 11. Coupler 12 is shown in the context of an element that includes a hook 13 for coupling with one of a first pin 16 and a second pin 17 mounted in spaced apart pin supports 14 connected to bucket body 11. Pins 16 and 17 may be part of a coupling assembly 19 which is configured to connect implement 10 with a coupler such as coupler 12, or another type of coupling mechanism, having a coupling width which differs from a coupling width with which implement assembly 8 was originally manufactured. Adapting of the coupling width, in this case reducing the coupling width, of implement 10 is achieved via a specialized spacing assembly 20 that includes a spacing element 22 and a spring clamp 24, each of which may have an annular configuration, as further described herein.

Although the present disclosure is illustrated herein by way of specific embodiments, it should be appreciated that a wide variety of implements and a wide variety of couplers and linkage coupling apparatuses may fall within its scope. For example, rather than a coupler 12 having a hook 13 which engages about one of pins 16 and 17, implement 10 might be picked up and utilized by a machine in which implements are coupled directly to a linkage member such as a stick, rather than a separate coupler. Still other coupling strategies may be amenable to use with the presently disclosed designs. Similarly, implement 10 might be any of a wide variety of implements, including but not limited to buckets, shovels, forks, blades, etc. In certain embodiments, implement 10 could even consist of a hydraulically or pneumatically actuated device such as a tamper. It should still further be appreciated that buckets and other implements having a single pin which couples to a linkage or coupler might be used, rather than implements having a dual pin design as shown in FIG. 1 and configured for use in either of a frontward or a backward orientation. The present disclosure is contemplated to provide greater flexibility and robustness in coupling hardware than earlier designs.

Figure 2:
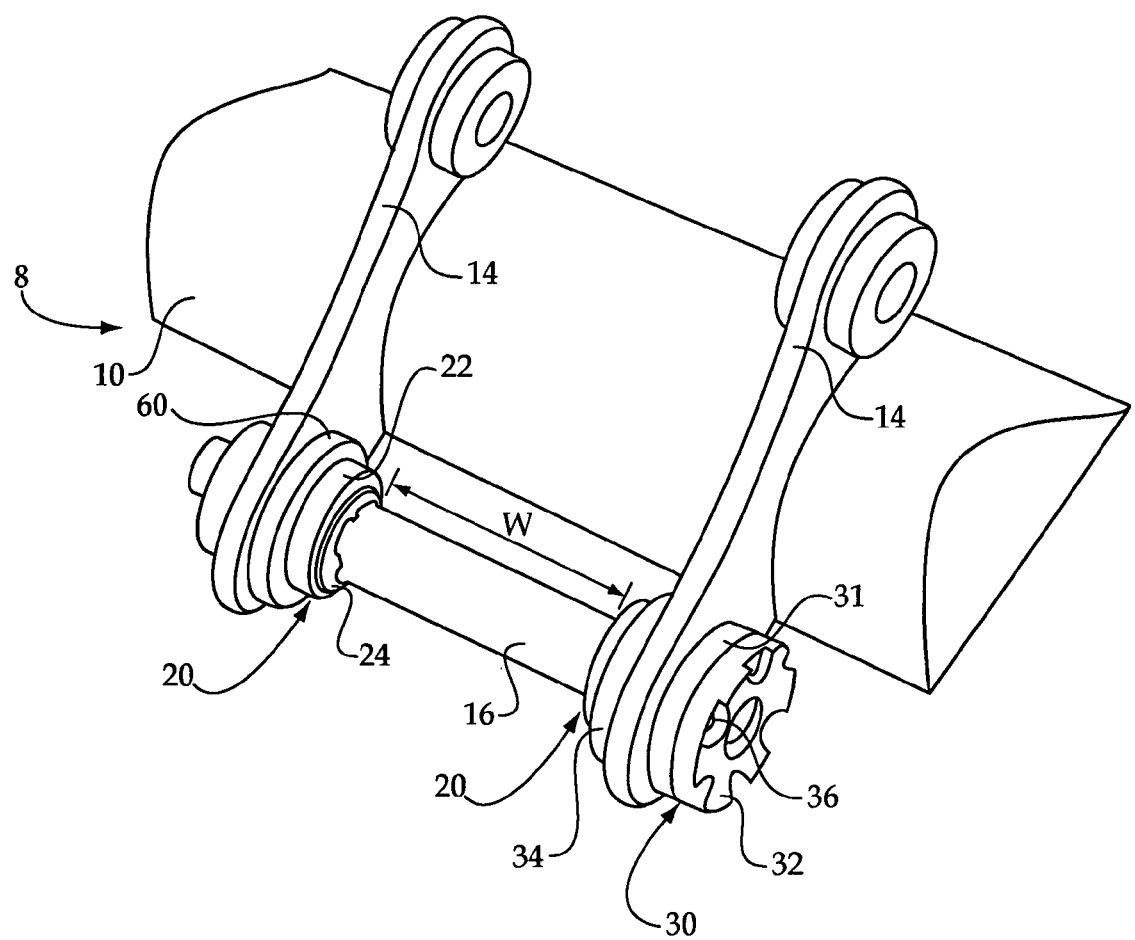
FIG. 2 is a diagrammatic view of an implement assembly according to one embodiment.

Referring now to FIG. 2, there is shown an implement assembly 8 which is similar to implement assembly 8 of FIG. 1, and therefore is illustrated with similar numerals identifying similar features to those shown in FIG. 1. As illustrated, pin 16 is mounted within spaced apart pin supports 14, each of which includes a member 60, 34 configured to support ends of pin 16. An available coupling width of pin 16 is identified as width W, and defined by an exposed portion of pin 16. A first and a second spacing assembly 20 are positioned adjacent members 60 and 34, respectively. Implement assembly 8 may be understood as an implement assembly originally manufactured to most readily couple with a linkage or coupler having a coupling width larger than coupling width W shown in FIG. 2, e.g. a coupling width that assembly 8 might have absent spacing assemblies 20. The addition of spacing assemblies 20 reduces the coupling width of implement assembly 8 such that it is adapted for use with couplers and/or linkages having a corresponding width. If use with a machine having a larger coupling width than width W is desired, spacing assemblies 20 may simply be removed, or substituted with relatively thinner spacing assemblies.

In one embodiment, member 60 may comprise a boss, and a bucket adjuster group 30 may serve a counterpart function to boss 60, adjuster group 30 and boss 60 being positioned in the separate spaced apart pin supports 14. Boss 60 and bucket adjuster group 30 will each function to retain an end of pin 16 in a conventional manner. Bucket adjuster groups such as bucket adjuster group 30 are well known in the art, and may comprise an end cap 32 having a plurality of fasteners 36 extending therein. In addition to supporting pin 16, bucket adjuster group 30 may be configured to position an element generally referred to as a "flange" 34 at a desired position on pin 16, on an opposite side of pin support 14. A bucket adjuster shim 31 may be positioned adjacent end cap 32 to provide a desired spacing such that flange 34 is relatively snug against a coupler hook when engaged about pin 16. Conventional bucket adjuster group flanges are typically free sliding. As further described below, however, the present disclosure may be applied to flanges similar to flange 34 to inhibit movement along a pin. In the context of the embodiment of FIGS. 2 and 3, bucket adjuster group 30 may be used in conjunction with one of the illustrated spacing assemblies 20 to snug the coupling hardware against coupler 12 or a linkage when engaged about pin 16. Embodiments are also contemplated wherein no bucket adjuster group is used.

Figure 3:
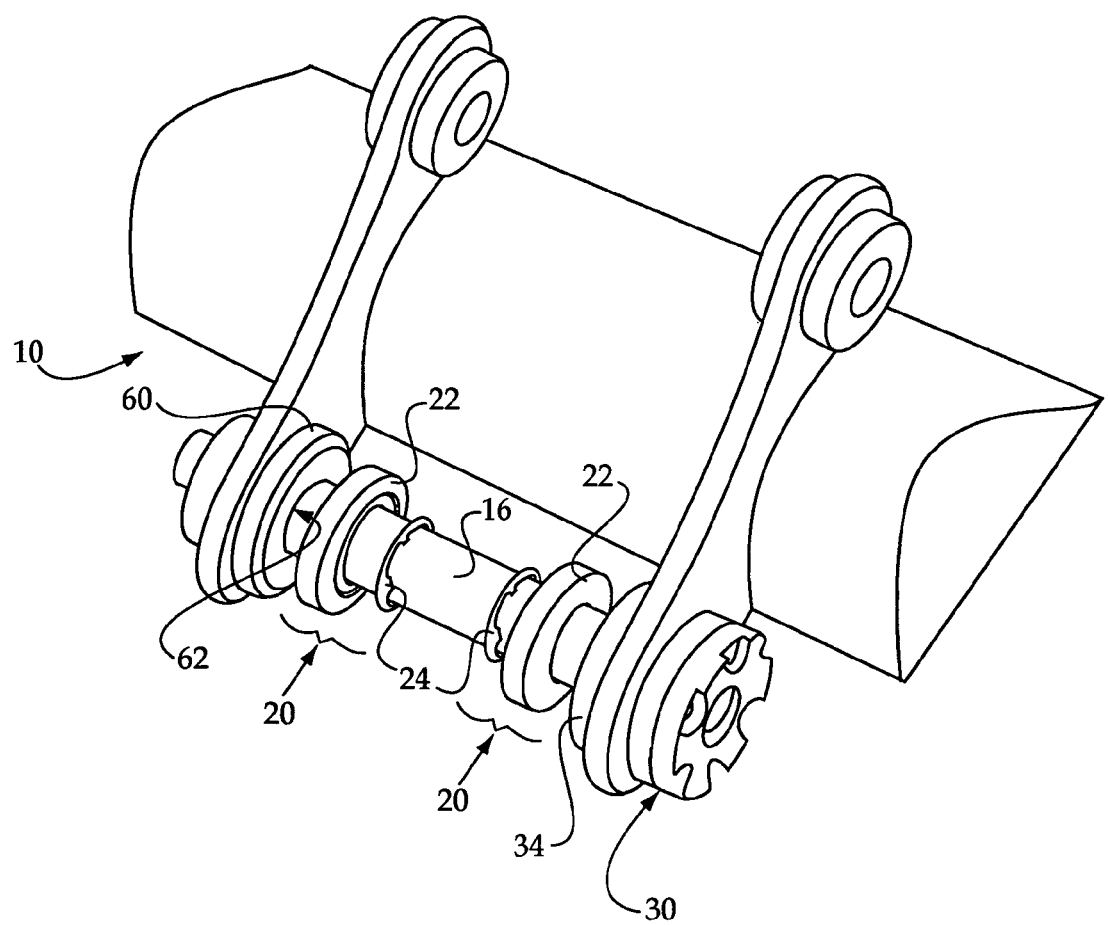
FIG. 3 is a diagrammatic view of an implement assembly similar to that of FIG. 2.
Figure 4:
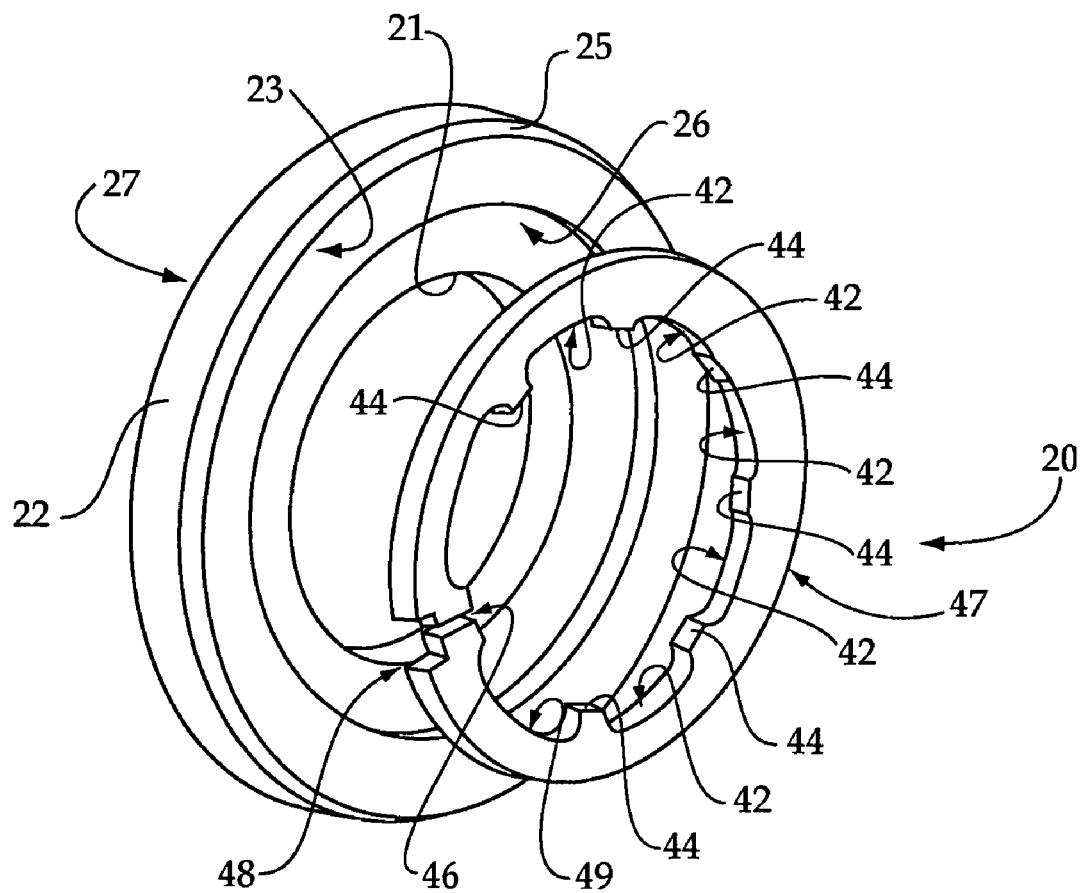
FIG. 4 is a perspective view of a spacing assembly according to one embodiment.

Referring to FIG. 3, there are shown the components of spacing assembly 20 displaced from their first and second respective locations on pin 16 adjacent components 60 and 34. Referring also to FIG. 4, there is shown a perspective view of spring clamp 24 and spacing element 22, which together make up each spacing assembly 20. In one embodiment, spacing element 22 and spring clamp 24 will be sold together as a kit, two of which may be used together to reduce the coupling width of a pin in an implement assembly such as assembly 8. Thus, each of the components of two spacing assemblies 20 may be mounted on pin 16, and the respective components positioned at locations along pin 16 to adjacent boss 60 and flange 34 to define a coupling width via the exposed length of pin 16. As alluded to above, one of the shortcomings of earlier strategies for reducing a coupling width of a pin was that free-floating spacers tended to migrate from their desired locations and get in the way when attempting to engage a coupler hook about a pin. The present disclosure overcomes this shortcoming by providing specialized coupling hardware which resists movement along the pin. This is accomplished in particular via the use of the split-ring style spring clamp 24.

When it is desirable to move spring clamp 24 along pin 16, a spreading tool may be engaged in a cutout 48 formed in an outer diameter 47 of spring clamp 24, and used to urge spring clamp 24 apart at a splitline 46. When the spreader tool is used to relieve a clamping force of spring clamp 24 on pin 16, a plurality of pin contact surfaces 44, comprising a finite number of pin contact surfaces 44, will be urged out of frictional engagement, or out of contact, with pin 16 such that the spring clamp 24 may be readily slid along pin 16. When a user ceases to urge pin contact surfaces 44 away from pin 16 with a spreader tool or the like, a spring force of spring clamp 24 about pin 16 will be reestablished, resisting axial displacement of spring clamp 24 and parts adjacent thereto along pin 16.

Each one of spring clamps 24, via clamping force about pin 16, may thus be used to inhibit movement of one of spacing elements 22 along pin 16. In one contemplated embodiment, once spacing elements 22 are positioned at desired locations on pin 16, spring clamps 24 may be slid along pin 16 to positions at least partially within recesses 26 formed in an inboard surface on a first end 23 of each spacing element 22. Each recess 26 may have a depth corresponding to an axial thickness of the corresponding spring clamp 24, for example such that each spring clamp 24 is completely received within recess 26 of the associated spacing element 22, and thereby concealed and shielded from being struck by a coupler or other element, approximately as shown in FIG. 2. It will be noted that spacing element 22 includes an outboard surface which is parallel to the inboard surface and is on a second end 27 opposite first end 23, defining between them a thickness of the spacing element which in most embodiments will be greater than a thickness of the associated spring clamp 24. Each spacing element 22 may further include a bore 21 wherein pin 16 is received. Additional protection of the components of spacing assembly 20 from damage, strain, etc. may be achieved via a deflection surface 25 on each one of spacing elements 22, which comprises a beveled surface configured to deflect a coupler, etc. which unintentionally strikes spacing element 22, toward a coupling zone of pin 16. In other words, where each spacing assembly 20 is configured with a spacing element 22 having a deflection surface 25, when an operator attempts to engage hook 13 or a similar coupling device with implement assembly 8, but positions hook 13 either left or right of an appropriate position, deflection surfaces 25 will have a tendency to deflect hook 13 towards the exposed portion of pin 16. This configuration will facilitate engagement and also protect and shield each spring clamp 24 and spacing element 22 from damage by coupler 12.

Each of the pin contact surfaces 44 of each spring clamp 24 may be positioned on inwardly extending studs 44, each of the inwardly extending studs 44 being separated one from the other by spring zones 42. Each spring zone 42 may be profiled according to a stress distributing curve. In the embodiment of spring clamp 24 shown in FIG. 4, five spring zones 42 profiled according to a stress distributing curve and seven studs 44 are shown. Regions of inner diameter 49 between splitline 46 and the first stud 44 on each side of splitline 46 need not necessarily be profiled according to the stress distributing curve, although they could be. The effect of profiling the regions of inner diameter 49 immediately adjacent splitline 46 on the spring characteristics of spring clamp 24 has been shown to be minimal. Thus, it is not typically necessary to profile all of inner diameter 49 according to the stress distributing curve, and desired spring characteristics of each spring clamp 24 may be achieved by providing spring zones 42 profiled according to the curve which are distributed about less than 360°, and in particular less than about 200°, relative to the generally circular outer diameter 47 of each spring clamp 24.

Figure 5:
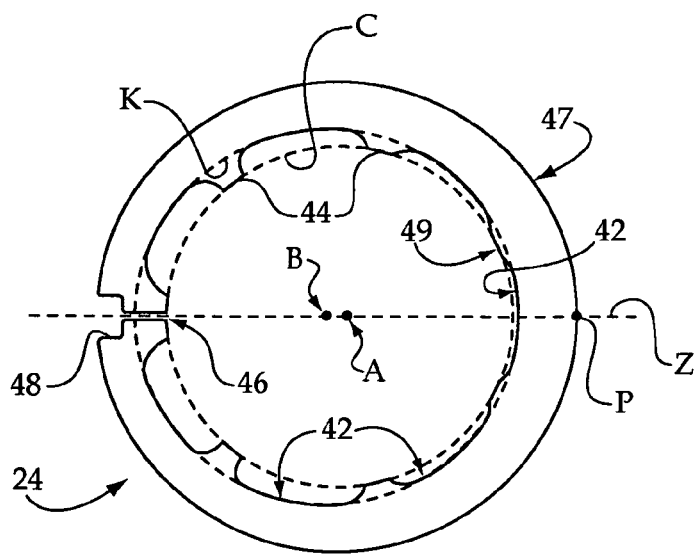
FIG. 5 is a top view of a spring clamp according to one embodiment.

Turning to FIG. 5, there is shown a top view of a spring clamp 24 according to one embodiment of the present disclosure. It should be understood that the present disclosure is not limited to spring clamps having any particular number of spring zones, studs, etc., or even limited to spring clamps having an inner diameter profiled as described herein, as other spring clamp configurations may be suitable. It has nevertheless been determined that spring characteristics are most affected by the relative thickness between inner diameter 49 and outer diameter 47 about a portion of spring clamp 24 spanning approximately 200° relative to circular outer diameter 47. A point P is shown in FIG. 5 approximately where an axis of symmetry Z intersects spring clamp 24 opposite splitline 46, and at outer diameter 47. The subject 200° range may be understood as encompassing about 100° in each direction from point P about outer diameter 47 of spring clamp 24. Thus, the remaining portion of spring clamp 24, i.e. not in the 200° range, will encompass about 80° in each direction from split line 46. It will be noted that axis Z also intersects a spring zone 42 opposite splitline 46.

It will further be noted that an average thickness of spring clamp 24, i.e. an average thickness between outer diameter 47 and inner diameter 49, increases in directions away from splitline 46, up to approximately point P as shown in FIG. 5. The non-uniform thickness between inner diameter 49 and outer diameter 47 will have the effect of distributing stress and spring force, rather than concentrating the stress/force at a position opposite splitline 46, or at other locations. Thus, when spring clamp 24 is loaded at splitline 46, for example, urged apart, stress will be distributed via spring zones 42, generally equally about clamp 24. Likewise, when spring clamp 24 is not loaded at splitline 46 and is permitted to clamp about pin 16, the clamping force will be distributed generally equally about clamp 24 via spring zones 42. When a uniform C-shaped spring clamp, where the inner diameter and outer diameter are concentric, is loaded at its splitline, i.e. the ends of the "C" are urged apart, the material strain will be concentrated at a position opposite the splitline. As a result of this stress concentration, in such spring clamps, it takes a relatively large amount of force to open the clamp a given amount. A relatively smaller displacement is required in such spring clamps to strain the material to a maximum design stress. In contrast, the spring clamps described herein are designed to distribute stress rather than concentrate it, and will have a relatively greater spring displacement under a given load as compared to concentric circle designs. In other words, spring clamps of the present disclosure will be relatively easier to spread than certain other designs, permitting them to be readily moved along pin 16 when urged apart at splitline 46, but still providing a relatively strong net clamping force about pin 16.

Stress distribution, and clamping force distribution, in each spring clamp 24 is achieved via the profiled inner diameter 49, as mentioned above. In particular, spring zones 42 may be profiled according to a circular stress distributing curve, shown via circle K in FIG. 5, having a center point B. In other words, spring zones 42 will be formed such that the spring zone portions of inner diameter 49 partially follow circle K, for about 200° of outer diameter 47. In some instances, additional profiling beyond the 200° range may be made to improve flexibility, reduce weight, etc., but will have little effect on the spring characteristics of clamp 24. Another circle C, having a center point A, may be concentric with outer diameter 47 of spring clamp 24. In general terms, inner diameter 49, and in particular spring zones 42, are defined at least in part by a difference between circles C and K, the difference resulting from eccentricity of circle K relative to circle C. It will generally be desirable to provide as much of inner diameter 49 as possible which is profiled according to the stress distributing curve, i.e. circle K in FIG. 5, within the described 200° range, while still providing a plurality of studs 44 for actually gripping and frictionally interacting with pin 16. Thus, clamp 24 may include spring zones 42 which are non-circular to maximize the portions of inner diameter 49 which follow circle K, as opposed to circular spring zones which might be only tangent to a stress distributing curve, as in certain earlier designs. A relatively greater eccentricity between circles C and K will tend to result in a relatively greater extent of stress distribution, i.e. less stress concentration in the region of spring clamp 24 opposite splitline 46, whereas a relatively lesser eccentricity will tend to result in a relatively lesser extent of stress distribution. Likewise, varying the relative size of circle K relative to circle C will tend to affect the stress distribution. Too much eccentricity between circles K and C or too large a relative size difference, however, may tend to result in cross-sections, i.e. a distance between inner diameter 49 and outer diameter 47, of spring clamp 24 that are too small. The small cross-section will then produce a localized stress concentration that is unacceptable, and may subject the material to a risk of yielding. Thus, a balance may be struck between, on the one hand, stress distribution radially around the spring clamp, and on the other hand, a section that produces a localized stress concentration in the spring clamp 24. In one practical implementation strategy, each of spring zones 42 may behave substantially as independent springs, having substantially equal net spring constants regardless of their relative position in spring clamp 24. By design, then, each spring zone 42 will absorb approximately the same amount of strain when spring clamp 24 is loaded at splitline 46, thus maximizing the net displacement of the spring for a given load, and facilitating its use as described herein without sacrificing clamping force. The behavior of spring clamp 24 may be thought of as analogous to multiple helical springs coupled together end-to-end. When a load is applied to one spring, each spring of the coupled group will experience a similar load. The geometry of spring clamp 24 described herein will permit each spring zone 42, analogous to each member of a coupled group of springs, to behave as if it has the same or a similar spring constant as each of the other spring zones such that strain is absorbed more or less equally among spring zones 42.

Figure 6:
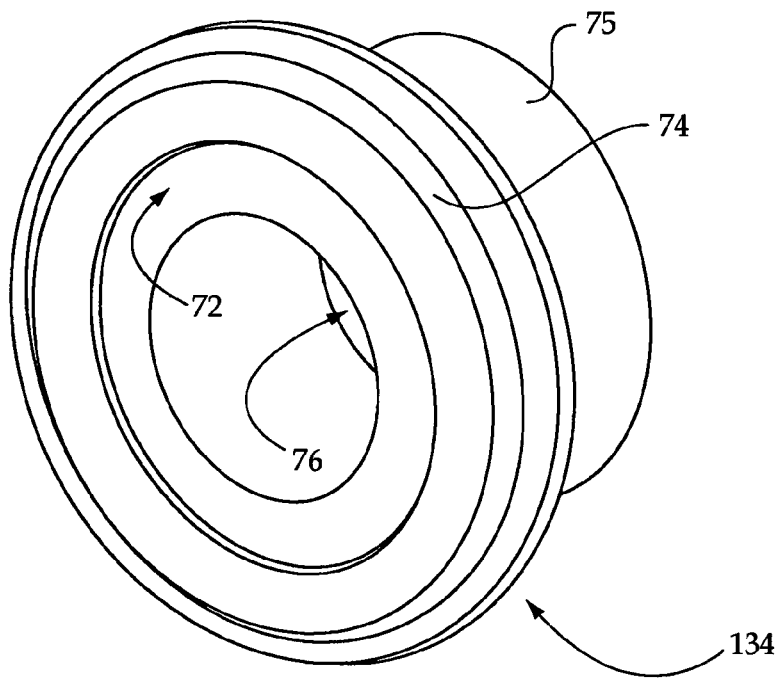
FIG. 6 is a pictorial view of a portion of a bucket adjuster group according to one embodiment.

Turning to FIG. 6, there is shown a bucket adjuster group flange 134 according to one embodiment. As described above, bucket adjuster groups such as group 30 shown in FIG. 1 may or may not be used in conjunction with the present disclosure. Flange 134 shown in FIG. 6 represents a component for a bucket adjuster group which is configured for use with a spring clamp such as spring clamp 24. To this end, flange 134 may include a cylindrical body portion 75 for positioning in a pin support 14, an axial bore 76 configured to receive a pin such as pin 16, and a recess 72 coaxial with bore 76 which is configured to at least partially receive a spring clamp such as spring clamp 24. Recess 72 may have a depth corresponding to a thickness of the spring clamp received therein, similar to spacing elements 22. Flange 134 may further include a deflection surface 74 serving purposes similar to that of surface 25 on spacing elements 22, described above. On the one hand, flanges such as flange 134 may be used in bucket adjuster groups similar to adjuster group 30 in a conventional manner, i.e. for positioning a coupler or linkage snug with coupling hardware when engaged about a pin, apart from applications where coupling width is at issue. In such an embodiment, the use of a spring clamp 24 could inhibit movement of flange 134 from a desired location on a pin. On the other hand, flange 134 might be used along with a spacing assembly such as spacing assemblies 20 described herein. In such an embodiment, the spacing assemblies and flange 34 could both be used with spring clamps to inhibit movement along a pin.

Figure 7:
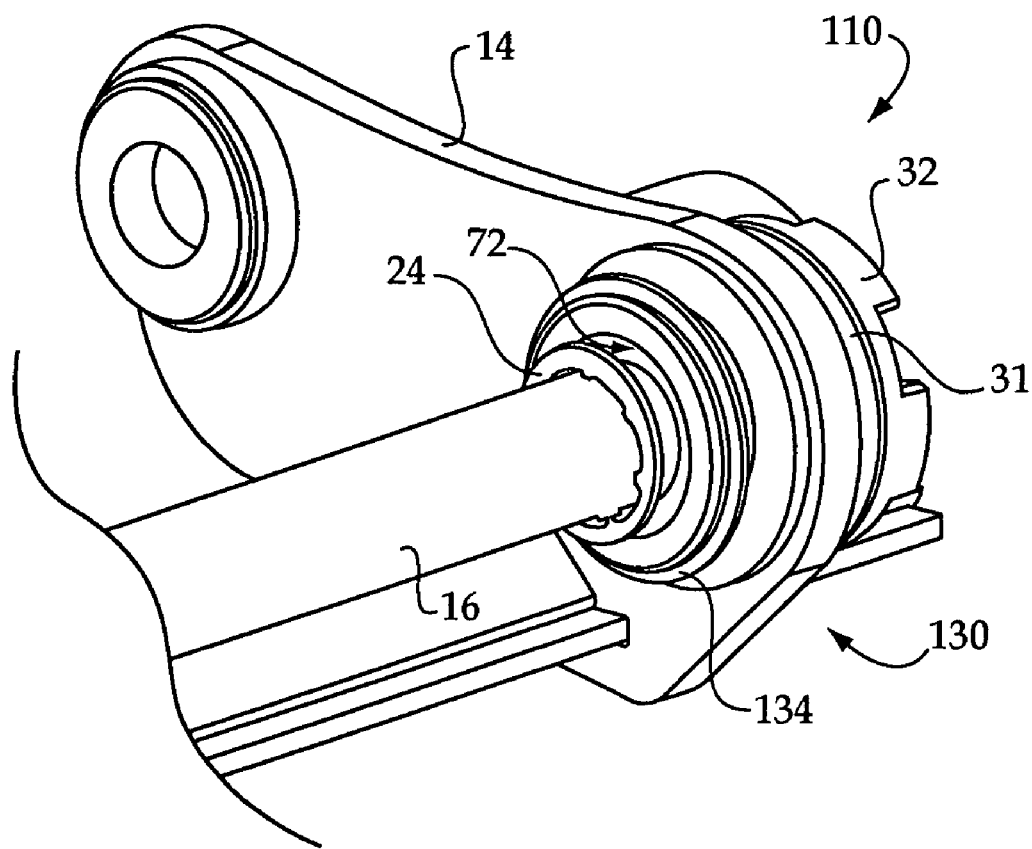
FIG. 7 is a pictorial view of a portion of an implement having a bucket adjuster group according to one embodiment.

Referring also to FIG. 7, there is shown a flange 134 similar to that of FIG. 6, mounted in a pin support 14, which is in turn mounted on an implement 110. Flange 134 is part of a bucket adjuster group 130, according to one embodiment of the present disclosure. Identical numerals to those used in identifying features described above are used in FIG. 7, namely, 16 denotes a pin, 24 denotes a spring clamp, 32 is an end cap, 31 is a shim, and 72 identifies a recess wherein spring clamp 24 may be at least partially received to shield it from damage by a coupling hook, etc. Spring clamp 24 is shown in FIG. 7 spaced from flange 34. As mentioned above, spring clamp 24 may be positioned within recess 172 such that flange 134 is inhibited from moving along pin 16. Positioning one or more shims 31 between end cap 32 and pin support 14 will permit the relative position of flange 134 to be adjusted, such that it may be snugged against a coupling member engaged with pin 16.

INDUSTRIAL APPLICABILITY

Referring to FIGS. 2-4 in particular, when a user wishes to adapt a particular implement such as implement 10 for use with a coupler or linkage having a relatively narrower coupling width in accordance with the present disclosure, the user may obtain a set of spacing assemblies 20. Spacing assemblies 20 may be sold as a kit consisting of one spacing element 22 and one spring clamp 24, as it may be desirable in some instances to replace a single existing spacing assembly which has worn out in an implement assembly already having a reduced coupling width. Other kits including additional coupling hardware components such as replacement pins are also contemplated.

A typical scenario for adapting a coupling width of an implement assembly may begin by a technician first sliding pin 16 out of one of pin supports 14. If worn or unsuitable existing spacing assemblies 20 are to be replaced, one or more of the spacing assemblies 20 will be slid off of an end of pin 16 after removing pin 16 from one of pin supports 14. Removal of a spacing assembly 20 may take place, for example, by positioning a conventional spreader tool within cutout 48 of a spring clamp 24, and urging the spring clamp apart at splitline 46. Clamps 24 will typically be able to be spread while within recesses 26, as recesses 26 are typically provided with enough clearance relative to clamps 24 to enable their spreading apart for adjustment. Urging spring clamp 24 apart will reduce its clamping force about pin 16 and allow spring clamp 24 to be slid along pin 16 and eventually removed from an end thereof. Spacing elements 22 are generally free sliding along pin 16, and thus may be readily removed once any spring clamps 24 are out of the way.

New or replacement spacing assemblies may be positioned on pin 16 by sliding spacing elements 22 onto pin 16, and sliding spring clamps 24 onto pin 16 via spreading each spring clamp 24 with a spreader tool to facilitate sliding. Once all of the components of each spacing assembly 20 are positioned on pin 16, it may be returned to its mounted position within pin supports 14. Spacing elements 22 may then be moved to desired locations against boss 60 and flange 34 or another boss. Spring clamps 24 may be moved into recesses 26, and the force applied via the spreader tool relieved to permit spring clamps 24 to engage about pin 16. Rather than a spreader tool, bores such as non-circular bores might be provided in spring clamps 24 on opposite sides of splitline 46 to facilitate spreading spring clamps 24 apart at splitline 46, for example via common socket drives.

It is generally desirable to provide spring clamps 24 which have a sufficiently powerful spring force to inhibit any substantial movement of spacing elements 22 along pin 16. Movement of spacing elements 22 will be inhibited by a hook or other component positioned about pin 16 during operation, and hence the movement-inhibiting function of spring clamps 24 will tend to be most important during engagement and disengagement of coupler 8 or a linkage about pin 16, and when implement 10 is decoupled from a machine. The clamping force of spring clamps 24, however, should also not be made to grip so tightly about pin 16 that significant axial or thrust loads are transferred along pin 16 during use. In other words, some slip responsive to relatively larger axial forces applied to spring clamps 24 is desired. In one embodiment, an approximately seventy-five pound clamping force of each spring clamp 24 about pin 16 may be used, corresponding to about 167 Newtons per millimeter spring constant.

The present disclosure provides substantial advantages over earlier strategies for coupling certain implements with certain machines. In particular, the strategy described herein will allow implements having a relatively wider coupling width to be adapted for use with machines having a relatively narrower coupling width. This is contemplated to improve flexibility in implement use for a variety of machines, notably excavating machines. In addition, the present disclosure overcomes the problems associated with earlier strategies where loose spacers were positioned on a coupling pin, and frequently had to be manually positioned by an operator prior to coupling a particular implement with a machine. These goals are achieved via relatively small but robust spring clamps, applicable to many different machine and implement systems. Nesting together of spacing elements 22 and spring clamps 24 will also shield spring clamps 24 from much of the potential wear and damage associated with coupling together implements and machines. Moreover, all of the components which are the subject of the present disclosure are relatively easily manufactured from standard materials, and can quite easily be installed and removed in their intended service environment.

The present description is for illustrative purposes only, and should not be construed to narrow the breadth of the present disclosure in any way. Thus, those skilled in the art will appreciate that various modifications might be made to the presently disclosed embodiments, without departing from the intended spirit and scope of the present disclosure. For example, while the present description focuses largely on the use of a single spacing element with each spring clamp, the present disclosure is not thereby limited. Multiple spacers, shims etc. might be inhibited from movement with the spring clamps described herein, either by providing separate spring clamps dedicated to each spacer/shim, or by stacking a plurality of spacers/shims along pin 16 and inhibiting movement of the entire stack with a single spring clamp. Moreover, while in many embodiments, spring clamps 24 will serve relatively little spacing function themselves, in other embodiments spring clamps 24 might be relatively thicker and play a larger role in reducing the coupling width of pin 16. One or more spring clamps 24 on each side might also be used as the sole spacing hardware for adapting the pin coupling width. Further, while it is contemplated that spring clamps 24 will have a uniform axial thickness, in other embodiments the axial thickness might vary. Finally, while the present description emphasizes profiling inner diameter 49 of spring clamps 24 to achieve the goals of distributing clamping force, etc., outer diameter 47 might instead by profiled. Other aspects, features and advantages will be apparent upon an examination of the attached drawings and appended claims.

We claim:

1. A spacing assembly for adjusting a coupling width on an implement comprising:
    a first and second spacing element, each of the spacing elements having a first end having an inboard surface and an opposite second end having an outboard surface and including a thickness between said first end and said second end, said spacing element further including a bore extending between said first end and said second end which defines a spacing element longitudinal axis and a recess coaxial with said bore and disposed at said first end, said first and second spacing elements being positionable on an implement coupling pin such that said inboard surfaces face one another and freely slidable along the length of said pin to reduce an implement coupling width thereof;
    each spacing element further having an exposed outer surface which includes an exposed outer surface length extending from said first end to said second end, and at least three outer surface points positioned between said first end and said second end at both a uniform axial position and a uniform radial distance relative to the longitudinal axis, and said first end further including an exposed end surface having an inner peripheral edge adjoining said recess, and an outer peripheral edge adjoining said exposed outer surface and surrounding said bore; and
    a first and second spring clamp, each of the spring clamps positionable at least partially within the recess of a corresponding one of said first and second spacing elements and configured to inhibit movement of said spacing element along said pin, said clamp having a thickness less than the thickness of said spacing element and including an outer diameter and an inner diameter, wherein said inner diameter includes pin clamping surfaces configured to engage about said pin with a clamping force, and spring zones extending between said pin clamping surfaces, and wherein said clamp is movable along said pin via relieving said clamping force on said pin;
    wherein a clearance exists between said outer diameter of each said clamp and said recess of said corresponding spacing element such that said clamp may be spread apart while positioned within said recess to relieve said clamping force against said pin; and
    wherein each said spring clamp includes a non-uniform radial thickness between said outer diameter and said inner diameter varying between greater thickness at said pin clamping surfaces and lesser thickness in said spring zones, wherein the radial thickness defines a shape profile of each of said spring zones and said spring zones have among them at least three different shape profiles, and wherein a first circle defined by said pin clamping surfaces is concentric with a second circle defined by said outer diameter.

2. The spacing assembly of claim 1 wherein said inner diameter of each said clamp is profiled at least in part according to a stress distributing curve and includes a finite number of said pin clamping surfaces.

3. The spacing assembly of claim 1 wherein each said clamp includes a splitline and an axis of symmetry extending through said splitline, and wherein said inner diameter includes a plurality of said pin clamping surfaces disposed on inwardly extending studs positioned on opposite sides of said axis of symmetry and separated one from the other by said spring zones; and
    wherein said spring zones include a first spring zone intersected by said axis of symmetry and having a shallower shape profile in a radial direction relative to said first circle, and a second spring zone adjacent to said first spring zone and having a deeper shape profile in the radial direction relative to said first circle.

4. The spacing assembly of claim 1 wherein each said clamp comprises a uniform thickness, and wherein said recess of said corresponding spacing element has a depth corresponding to said thickness of said clamp, and said exposed outer surface comprising a deflection surface located at said first end and adjoining said exposed end surface.

5. The spacing assembly of claim 1 wherein each said clamp includes a circular outer diameter, said plurality of spring zones alternating with said pin clamping surfaces and defining a third circle which is eccentric with respect to said second circle, and wherein a number of said pin clamping surfaces is greater than three.

6. A spacing assembly for adjusting a coupling width on an implement comprising:
- a first and second annular spacing element, each of the spacing elements including a first end having an inboard surface and a second end opposite the first end having an outboard surface which is parallel to the inboard surface, a bore extending between the first end and the second end and defining a longitudinal axis, an annular recess formed within the first end which is coaxial with the bore, the spacing element having a thickness defined between the inboard surface and the outboard surface;
- each spacing element further having an exposed outer surface which includes an exposed outer surface length extending from said first end to said second end, and at least three outer surface points positioned between said first end and said second end at both a uniform axial position and a uniform radial distance relative to the longitudinal axis, and said inboard surface including an exposed end surface having an inner peripheral edge adjoining said recess, and an outer peripheral edge adjoining said exposed outer surface and surrounding said bore;
- a first and second annular spring clamp, each of the spring clamps positioned at least partially within the recess of a corresponding one of said first and second spacing elements, the spring clamp having a thickness which is less than the spacing element thickness, the spring clamp including an outer diameter and an inner diameter having pin clamping surfaces configured to engage an implement coupling pin with a clamping force, and spring zones extending between the pin clamping surfaces, to inhibit the clamp from sliding along the length of the pin when the clamp is positioned on the pin and the clamping force is applied to the pin, said first and second spacing elements being positionable on the pin such that said inboard surfaces face one another and freely slidable along the length of the pin to reduce an implement coupling width thereof;
- wherein each said spring clamp includes a non-uniform radial thickness between said outer diameter and said inner diameter varying between greater thickness at said pin clamping surfaces and lesser thickness in said spring zones, wherein the radial thickness defines a shape profile of the spring zones and the spring zones have among them at least three different shape profiles, and wherein a first circle defined by said pin clamping surfaces is concentric with a second circle defined by said outer diameter; and,
- a clearance between each corresponding recess and the outer diameter such that each clamp may be spread open to relieve the clamping force while the clamp is positioned within the recess.

7. A spacing assembly according to claim 6 wherein the inner diameter of each clamp is profiled at least in part according to a stress distributing curve and includes a finite number of the pin clamping surfaces.

8. A spacing assembly according to claim 6 wherein each clamp includes a splitline and an axis of symmetry extending through the splitline, and wherein the inner diameter includes a plurality of the pin clamping surfaces disposed on inwardly extending studs positioned on opposite sides of the axis of symmetry and separated one from the other by the spring zones.

9. A spacing assembly according to claim 6 wherein each clamp comprises a uniform thickness, and wherein the recess of the spacing element has a depth which is the same as or greater than the thickness of the clamp.

10. A spacing assembly according to claim 6 wherein each clamp includes a circular outer diameter, and the plurality of spring zones defining a third circle which is eccentric with respect to the circular outer diameter.

11. A spacing assembly according to claim 10 wherein the inner diameter of each clamp includes a finite number of said pin clamping surfaces disposed on inwardly extending studs.

12. A spacing assembly for adjusting a coupling width on an implement comprising:
- a first annular spacing element and a second annular spacing element, each of the spacing elements including a first end having an inboard surface, a second end opposite the first end having an outboard surface which is parallel to the inboard surface, and an exposed outer surface extending from the inboard surface to the outboard surface, a bore extending between the first end and the second end, an annular recess formed within the first end which is coaxial with the bore, each spacing element having a thickness defined between the inboard surface and the outboard surface, and each of the inboard surfaces including an exposed end surface having an inner peripheral edge adjoining the corresponding recess, and an outer peripheral edge adjoining the exposed outer surface and surrounding said bore;
- a first annular spring clamp positioned at least partially within the recess of the first annular spacing element and a second annular spring clamp positioned at least partially within the recess of the second annular spacing element, each spring clamp having a thickness which is less than the spacing element thickness, and including an outer diameter and an inner diameter configured to engage an implement coupling pin with a clamping force to inhibit the clamp from sliding along the length of the pin when the clamp is positioned on the pin and the clamping force is applied to the pin, the inner diameter including a finite number of pin clamping surfaces disposed on inwardly extending studs and spring zones alternating with said inwardly extending studs, the pin clamping surfaces defining a first circle which is concentric with the outer diameter and the spring zones defining a second circle which is eccentric with respect to the outer diameter; and
- an implement coupling pin having a first pin end, a second pin end, and a uniform cylindrical outer surface extending from the first pin end to the second pin end, the first annular spacing element and the second annular spacing element being positioned on the pin in contact with the uniform cylindrical outer surface at a first location adjacent the first pin end and a second location adjacent the second pin end, respectively, in a first assembly configuration of the spacing assembly, and wherein the pin clamping surfaces of each of the first and second spring clamps are frictionally engaged with the outer surface of the pin by way of the clamping force, and the first and second spring clamps inhibit sliding of the first and second spacing elements from the first and second locations, respectively;
- the first assembly configuration including an implement coupling configuration defining a coupling width of the pin, and the spacing assembly being adjustable to a second assembly configuration which includes a coupling width adjusting configuration where each of the first and second spacing elements and the spring clamps are positioned inboard of the first location and the second location, respectively, and the pin clamping surfaces frictionally engage with the outer surface of the pin by way of the clamping force, and wherein the inboard surfaces face one another in each of the first and second assembly configurations.

13. A spacing assembly according to claim 12 wherein each clamp includes a splitline and an axis of symmetry extending through the splitline.

14. A spacing assembly according to claim 12 wherein each clamp comprises a uniform thickness, and wherein the recess of each spacing element has a depth which is the same as or greater than the thickness of the clamp.

15. An implement assembly comprising:
  an implement which includes a bucket having a pair of spaced apart pin supports, a first pin and a parallel second pin, the first pin and the second pin mounted between the spaced apart pin supports;
  a first and a second annular spacing element, each including a first end having an inboard surface and a second end opposite the first end having an outboard surface which is parallel to the inboard surface, and a bore extending between the first end and the second end, the first pin positioned within and coaxial with each bore, and each bore being sized such that the corresponding spacing element can freely slide along the length of the first pin, and each spacing element further having an annular recess formed within the first end which is coaxial with the bore and the first pin, and a spacing element thickness defined between the inboard surface and the outboard surface, and the outboard surface of each spacing element abutting a different one of the spaced apart pin supports;
  a coupling mechanism contacting an exposed portion of the first pin extending between the inboard surfaces of the first and second spacing elements, and being positioned adjacent the inboard surfaces;
  a first and a second annular spring clamp abutting the first and second spacing elements, respectively, and positioned at least partially within the corresponding recess, each clamp having a thickness which is less than the spacing element thickness and including an outer diameter and an inner diameter engaging the first pin with a clamping force which inhibits the clamp from sliding along the length of the first pin, and each clamp thereby maintaining the abutment of the corresponding spacing element to the one of the pin supports and maintaining the implement assembly in a coupling configuration;
  wherein the inboard surfaces face one another and the exposed portion of the first pin defines a narrow coupling width in the coupling configuration, and the implement assembly further having a coupling width adjusting configuration, and in the coupling width adjusting configuration the inboard surfaces face one another and each spacing element is positioned on the first pin at a location spaced from and inboard of each of the pin supports.

16. An implement assembly according to claim 15 further comprising:
  a clearance between each corresponding recess and the outer diameter such that each clamp may be spread open to relieve the clamping force while the spring clamp is positioned within the recess.

17. An implement assembly according to claim 16 wherein each clamp comprises a uniform thickness, and wherein the recess of the spacing element has a depth which is the same as or greater than the thickness of the clamp.

18. An implement assembly according to claim 17 wherein each clamp includes a splitline and an axis of symmetry extending through the splitline, and wherein the inner diameter includes a plurality of pin clamping surfaces disposed on inwardly extending studs positioned on opposite sides of the axis of symmetry and separated one from the other by spring zones.

19. An implement assembly according to claim 15 wherein each clamp comprises a uniform thickness, and wherein the recess of the corresponding spacing element has a depth which is the same as or greater than the thickness of the clamp.

20. An implement assembly according to claim 15 wherein each clamp includes a splitline and an axis of symmetry extending through the splitline, and wherein the inner diameter includes a plurality of pin clamping surfaces disposed on inwardly extending studs positioned on opposite sides of the axis of symmetry and separated one from the other by spring zones.

* * * * *